United States Patent [19]

Yagi et al.

[11] Patent Number: 5,698,913
[45] Date of Patent: Dec. 16, 1997

[54] OUTER-ROTOR TYPE ELECTRIC ROTARY MACHINE AND ELECTRIC MOTOR VEHICLE USING THE MACHINE

[75] Inventors: Nobuyuki Yagi, Tokyo; Ko-ichi Matsuoka, Tokorozawa; Keiichiro Kondo, Tokyo, all of Japan

[73] Assignees: Kabushiki Kaisha Toshiba, Kawasaki; Railway Technical Research Institute, Tokyo, both of Japan

[21] Appl. No.: 661,787

[22] Filed: Jun. 13, 1996

[30] Foreign Application Priority Data

Jun. 15, 1995 [JP] Japan .................... 7-148780

[51] Int. Cl.$^6$ .................... H02K 9/22; H02K 9/00
[52] U.S. Cl. .................... 310/58; 310/59; 310/60 R; 310/61; 310/64; 310/52; 105/53; 105/59
[58] Field of Search .................... 310/52, 58, 59, 310/60 R, 64, 67 R, 255, 261, 53

[56] References Cited

U.S. PATENT DOCUMENTS

| | | | |
|---|---|---|---|
| 3,641,375 | 2/1972 | Moyer | 310/105 |
| 3,757,146 | 9/1973 | Love | 310/113 |
| 3,916,231 | 10/1975 | Cathey | 310/62 |
| 4,839,547 | 6/1989 | Lordo et al. | 310/60 |
| 5,019,737 | 5/1991 | Bruno | 310/89 |
| 5,196,749 | 3/1993 | Palma et al. | 310/64 |

FOREIGN PATENT DOCUMENTS

| | | | |
|---|---|---|---|
| 46315 | 2/1982 | European Pat. Off. | 310/64 |
| 1 347 605 | 11/1963 | France . | |
| 2 156 237 | 5/1973 | France . | |
| 55-150755 | 11/1980 | Japan | 310/58 |
| 144733 | 6/1988 | Japan | 310/64 |
| 635561 | 11/1978 | U.S.S.R. | 310/64 |

OTHER PUBLICATIONS

Patent Abstracts of Japan, vol. 7, No. 136 (E–181), Jun. 14, 1983, JP–58–049062, Mar. 23, 1983.

Primary Examiner—Thomas M. Dougherty
Assistant Examiner—B. Mullins
Attorney, Agent, or Firm—Oblon, Spivak, McClelland, Maier & Neustadt, P.C.

[57] ABSTRACT

An outer-rotor type electric rotary machine comprises a shaft fixed to a stationary unit, a motor stator, a motor rotor, a cylindrical rotor frame, and first and second brackets attached to rotary members, respectively. At least one of the first and second brackets includes a plurality of heat-radiating fins mounted on its outer peripheral surface, and a plurality of heat-absorbing fins mounted on its inner peripheral surface.

20 Claims, 8 Drawing Sheets

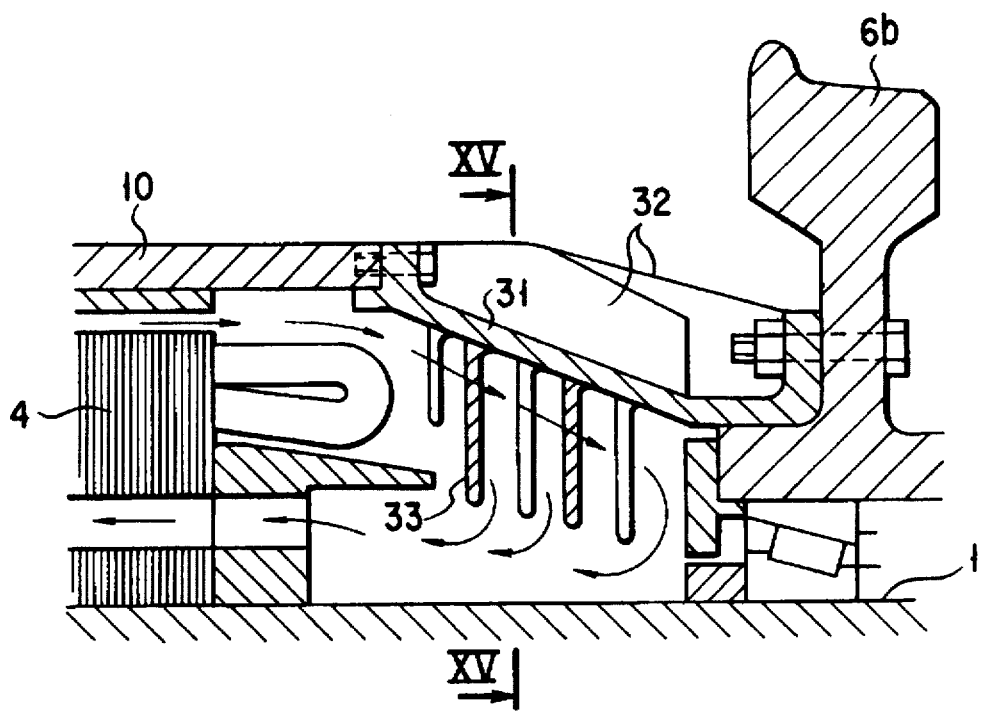
F I G. 14
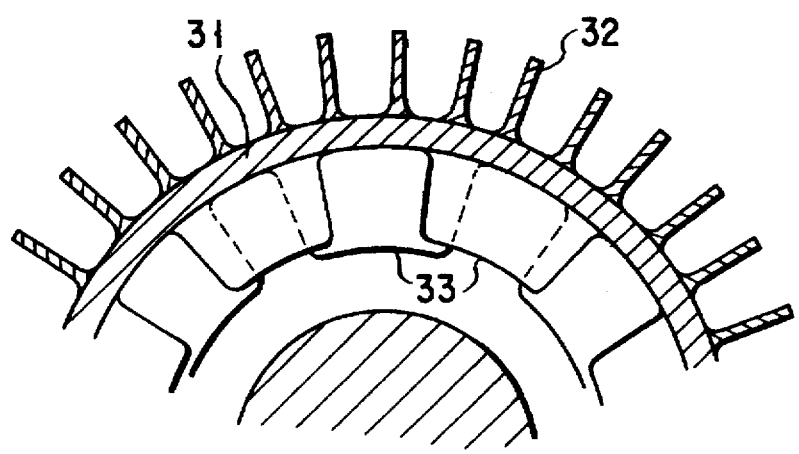
F I G. 15

OUTER-ROTOR TYPE ELECTRIC ROTARY MACHINE AND ELECTRIC MOTOR VEHICLE USING THE MACHINE

BACKGROUND OF THE INVENTION

1. Field of the Invention

This invention relates to an outer-rotor type electric rotary machine for use as a driving mechanism for driving a railroad electric motor vehicle, and an electric motor vehicle using the machine.

2. Description of the Related Art

Conventional driving mechanisms for driving railroad electric motor vehicles employ a mechanism for rotating an axle shaft and a wheel arranged integral with each other, while engaging a gear fixed to the rotary shaft of a main electric motor (hereinafter simply called a "motor") with a gear coaxially attached to the axle shaft.

Recently, a driving mechanism as shown in FIG. 1, which includes a wheel and a motor arranged integral with each other, has been developed in order to reduce noise generated by a vehicle and to facilitate maintenance thereof. In FIG. 1, a non-rotary axle shaft 1 has its opposite ends fixed to a vehicle truck 100 via shaft support boxes 2, respectively. The truck 100 and the axle shaft 1 constitute a stationary section. Wheels 6a and 6b disposed to run on a rail 102 placed on a base 101 are rotatably supported by the opposite ends of the axle shaft 1 via bearings 5a and 5b, respectively. A stator core 4 with a coil 3 is attached to a center portion of the axle shaft 1.

Each of brackets 7 and 8 has one end thereof attached to an inner portion of a corresponding one of the wheels 6a and 6b, and the other end fixed to a corresponding one of the opposite ends of a cylindrical rotor frame 10. A permanent magnet 9 is mounted on the lower surface of the rotor frame 10. The brackets 7 and 8 and the rotor frame 10 constitute a rotary section, together with the wheels 6a and 6b.

The electric rotary machine shown in FIG. 1 constitutes an outer-rotor type wheel-integrated synchronized motor using a permanent magnet. Specifically, the machine comprises the vehicle truck 100, stationary elements (i.e. the axle shaft 1, the coil 3 and the stator core 4) fixed to the truck 100, and rotary elements (i.e. the brackets 7 and 8, the permanent magnet 9 and the rotor frame 10).

The motor may be formed by using a coil in place of the permanent magnet 9 in the rotary section. The coil 3 and the stator core 4 constitute a motor stator, while the permanent magnet 9 or the coil used in place of the magnet constitutes a motor rotor. It is a matter of course that the motor includes an electric rotary machine such as an induction motor or a DC motor, as well as the synchronized motor.

Since the driving mechanism for driving the wheel-integrated type motor needs no gear device, the vehicle which employs it can reduce the level of noise it generates, and also the term for which inspection and/or disassembly for maintenance is not required can be extended. In order to make the most of these advantages, it is necessary to greatly extend the term for which the motor is not required to be disassembled and/or repaired. Further, it is necessary to give the motor an entirely closed structure.

In general, the conventional motors have built-in fans for passing outside air therethrough to cool itself. It is possible that dust or moisture in the air will enter and contaminate the motor, thereby reducing the insulation performance and/or the outgoing radiation effect. To avoid this, it is necessary to periodically disassemble the motor to clean its interior.

To prevent such contamination, it is considered to make the motor have a structure completely isolated from the outside. In this structure, however, air for cooling does not pass the interior of the motor, and accordingly its temperature will inevitably increase. To restrain an increase in temperature within an allowable range, the motor must be made large in size.

However, the space in the vehicle truck is limited, and it is necessary to reduce the weight of members located under springs attached to the truck, in order to realize higher speed running of the vehicle. In light of this, reduction of the size and weight of the motor is now demanded.

SUMMARY OF THE INVENTION

It is the object of the invention to provide a compact and light outer-rotor type electric rotary machine capable of effectively cooling a heat emission part (core, coil) therein even if the machine is of a completely closed type, and also to provide an electric motor vehicle using the rotary machine.

When in the electric rotary machine and the electric motor vehicle of the invention, a rotor frame and brackets are rotated, air is circulated through the machine by a fan operation effected by heat-absorbing fins mounted on the inner peripheral surface of one of the brackets, thereby cooling a heat emission section in the machine. Moreover, the bracket having its temperature increased as a result of heat absorption by the heat-absorbing fins is cooled by heat radiation by a multiple of heat-radiating fins mounted on the outer peripheral surface of the bracket. Accordingly, even if the electric rotary machine is of a completely closed type, the motor is effectively cooled. Therefore, increase of temperature is restrained, which enables the machine to be made compact and light.

The electric rotary machine and the electric motor vehicle of the invention are made to have an axial fan mechanism by arranging the heat-absorbing fins on both the brackets to have the same inclination relative to the axis of the brackets. If the direction of rotation of the rotor frame and the brackets is changed, air is circulated with the direction of its circulation changed. Also in this case, air is circulated through the machine to cool the heat-generating portion of the motor, and the heat of the circulated air is positively radiated to the outside by the heat-absorbing fins and the heat-radiating fins, thereby more enhancing the cooling effect.

In the electric rotary machine and the electric motor vehicle of the invention, the noise generated by the heat-absorbing fins can be reduced by providing, on the inner peripheral surface of each bracket, a circulating fan as well as heat-absorbing fins with no fan function. Furthermore, the circulating fan can appropriately set the rate of circulation of air. Also, the cooling effect can be enhanced by increasing the number of the heat-absorbing fins irrespective of the circulation rate.

In the electric rotary machine and the electric motor vehicle of the invention, air is circulated through the machine without being interrupted by the heat-absorbing fins and the heat-radiating fins mounted on both the brackets. Thus, the air is more efficiently cooled.

In the electric rotary machine and the electric motor vehicle of the invention, the heat-absorbing fins are made of an aluminum alloy which is light and of a high thermal conductivity. Accordingly, the machine can have a high heat-absorption effect by increasing the size of the heat-absorbing fins, without much increasing the weight thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 14 is a sectional view, showing a bracket section on the other side of an electric rotary machine according to a fifth embodiment of the invention; and FIG. 15 is a sectional view, taken along lines XV—XV in FIG. 14.

DETAILED DESCRIPTION OF THE PREFERRED EMBODIMENTS

Figure 1:
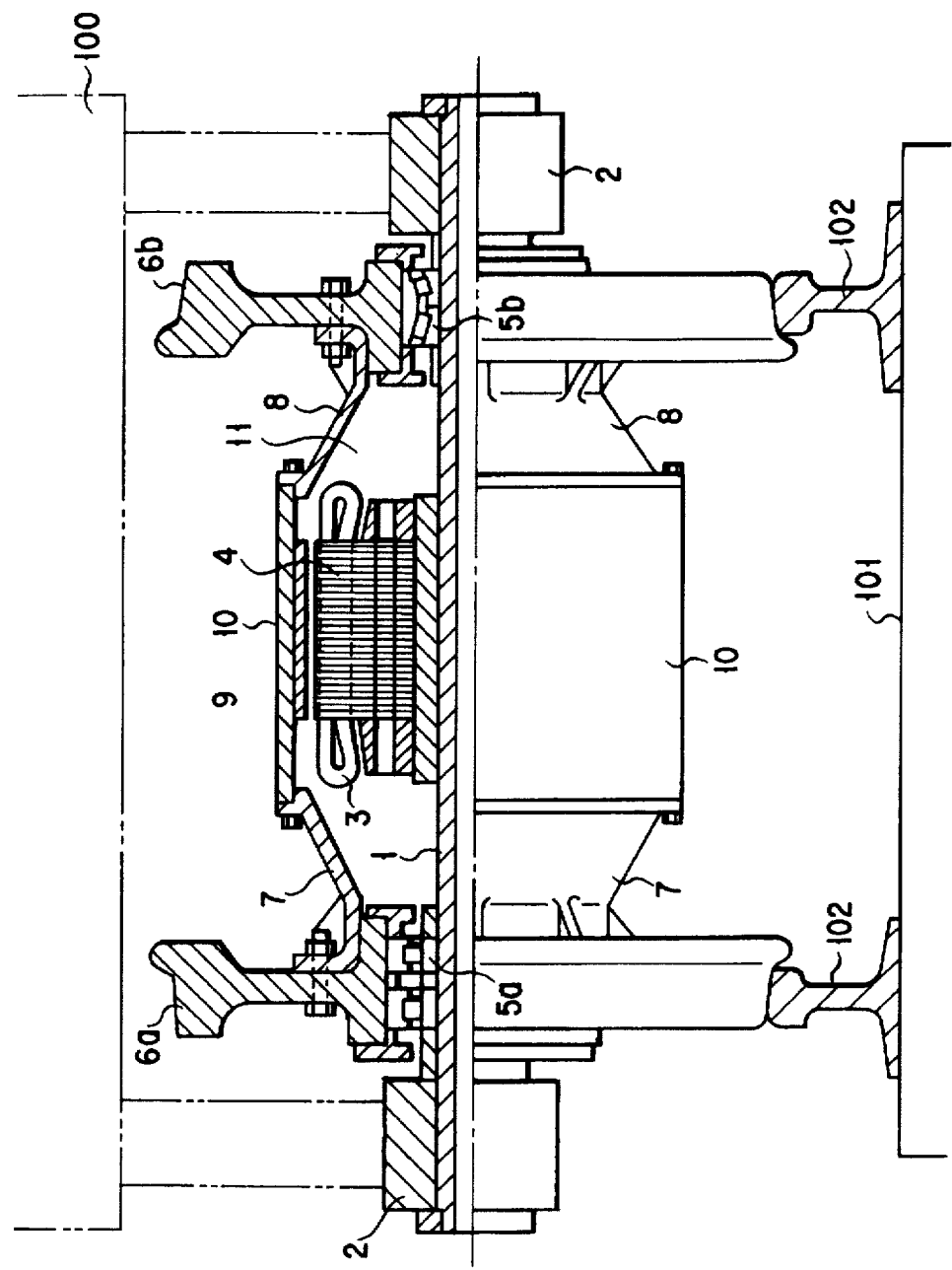
FIG. 1 is a sectional view, showing a conventional wheel-integrated type motor.
Figure 2:
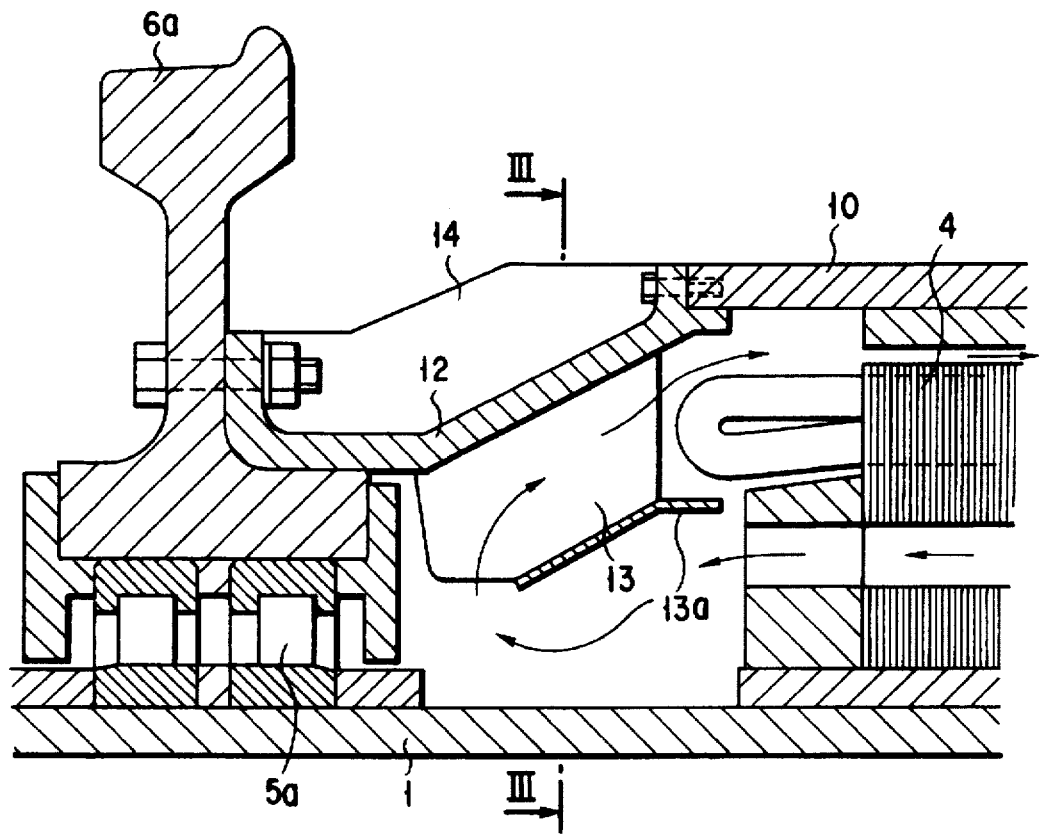
FIG. 2 is a sectional view, showing a bracket section on one side of an electric rotary machine according to a first embodiment of the invention.
Figure 3:
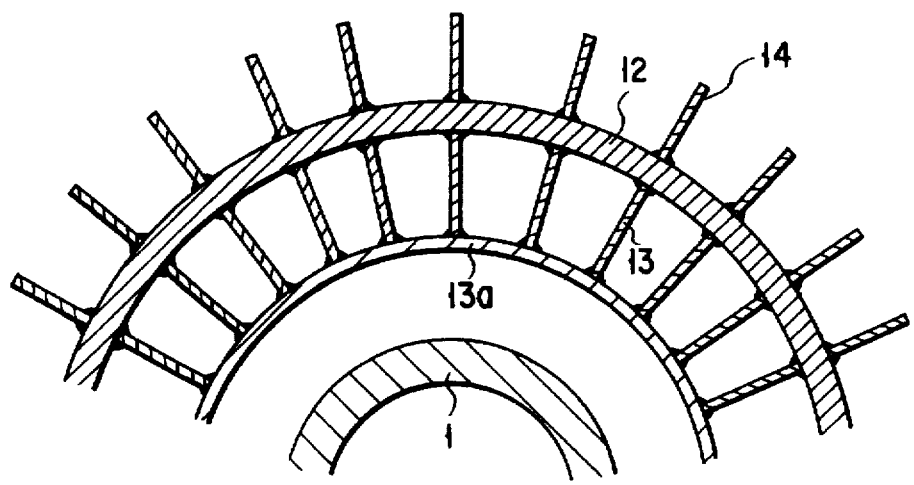
FIG. 3 is a sectional view, taken along lines III—III in FIG. 2.
Figure 4:
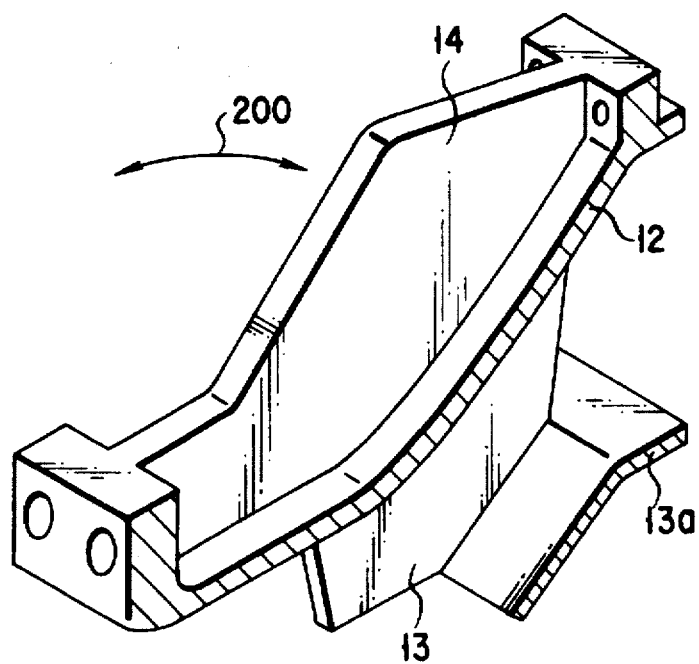
FIG. 4 is a partial perspective view, showing a heat-radiating fin, a bracket and a heat-absorbing fin employed in the electric rotary machine of FIG. 2.

Referring first to FIGS. 2–4, an electric rotary machine and an electric motor vehicle according to a first embodiment of the invention will be described. In this embodiment, a multiple of axially-elongated heat-radiating fins 14 are mounted at circumferentially regular intervals on the outer peripheral surface of one of brackets 12, while a multiple of axially-elongated heat-absorbing fins 13 are mounted at circumferentially regular intervals on the inner peripheral surface of the one bracket 12. Further, an annular member 13a is coupled with the radially inner ends of the heat-absorbing fins 13 and defines wind passages therebetween. The heat-absorbing fins 13 and the annular member 13a are inclined so that they can serve as fans and air can flow from the side of a bearing 5a through a space defined between a stator core 4 and a rotor frame 10.

Thus, the heat-radiating fins 14 and the heat-absorbing fins 13 extend substantially along an axle shaft 1, while the annular member 13a extends in the direction of rotation of the wheels. The heat-radiating fins 14 and the heat-absorbing fins 13 are fixed to the bracket 12 by welding, etc., while the annular member 13a is fixed to the heat-absorbing fins 13 by welding, etc. (see FIG. 3). It is a matter of course that at least the heat-radiating fins 14, the heat-absorbing fins 13 or the annular member 13a may be formed integral with the bracket 12 as one body, using a mold, etc. Moreover, at least the heat-radiating fins 14, the heat-absorbing fins 13 or the annular member 13a may be formed by cutting. The heat-radiating fins 14, the heat-absorbing fins 13 are the annular member 13a may be provided not only on the side of the one bracket 12 but also on the side of the other bracket 12. Arrow 200 appearing in FIG. 4 et seq. denotes the direction of rotation of the motor.

The operation of the electric rotary machine and the electric motor vehicle constructed as above will now be explained. When the bracket 12 rotates in accordance with the rotation of the motor, each heat-absorbing fin causes air to flow toward the space defined between the stator core 4 and the rotor frame 10. The air then flows from the space to the side of the other bracket, and returns to a space under the heat-absorbing fin 13 through a multiple of wind holes axially formed in the stator core 4. Thus, air is circulated through the rotary machine by the heat-absorbing fins 13.

Thus, air having passed a heat-generating section in the machine and heated to a high temperature is cooled as a result of heat absorption by the heat-absorbing fins 13 when it passes these fins. This circulation of air cools the heat-generating section, thereby restraining the increase of the temperature of the motor. On the other hand, the bracket 12, whose temperature is increased as a result of heat absorption by the heat-absorbing fins 13, has its heat radiated by the heat-radiating fins 14 provided on the outer periphery thereof. Accordingly, the temperature of the bracket 12 is reduced. The amount of radiation by the heat-radiating fins 14 increases when the bracket 12 rotates.

As described above, in the first embodiment, air is circulated through the machine to cool the heat-generating portion of the motor, and the heat of the circulated air is positively radiated to the outside by the heat-absorbing fins 13 and the heat-radiating fins 14. Thus, even if the electric rotary machine is of a completely closed type, the motor can be cooled effectively, and hence the increase of temperature can be minimized. As a result, a compact and light motor can be provided.

Figure 5:
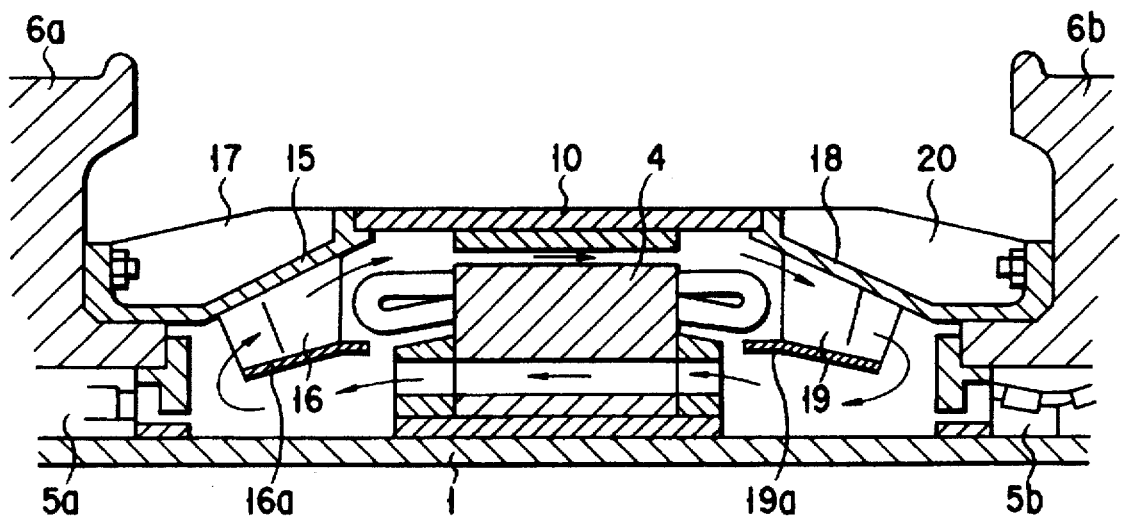
FIG. 5 is a sectional view, showing a bracket section on one side of an electric rotary machine according to a second embodiment of the invention.
Figure 6:
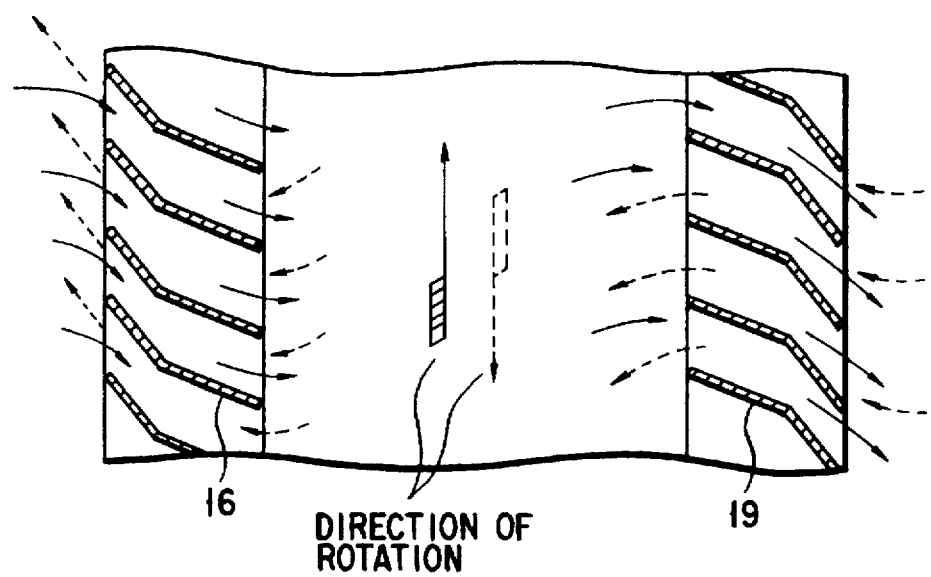
FIG. 6 is a development elevation, showing an example of the interior of the machine of FIG. 5.
Figure 7:
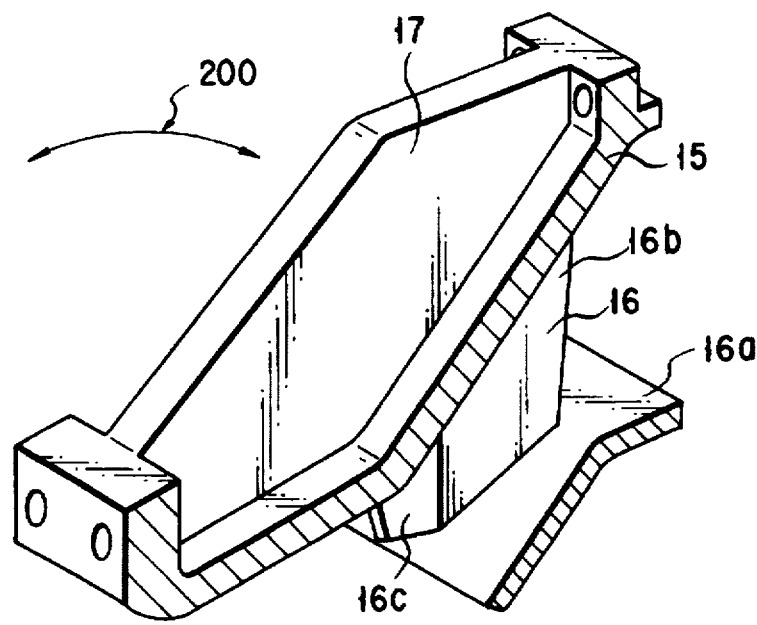
FIG. 7 is a partial perspective view, showing a heat-radiating fin, a bracket and a heat-absorbing fin employed in the electric rotary machine of FIG. 5.

Referring then to FIGS. 5–7, an electric rotary machine and an electric motor vehicle according to a second embodiment will be described. In this embodiment, a multiple of axially-elongated heat-radiating fins 17 and 20 are mounted at circumferentially regular intervals on the outer peripheral surfaces of opposite brackets 15 and 18 located between a rotor frame 10 and a wheel 6a and between the frame 10 and a wheel 6b, respectively. Further, a multiple of axially-elongated heat-absorbing fins 16 and 19 are mounted at circumferentially regular intervals on the inner peripheral surfaces of the bracket 15 and 18. Each of the heat-absorbing fins 16 and 19 are bent at an intermediate portion thereof. An annular member 16a is coupled with the heat-absorbing fins 16, and an annular member 19a with the heat-absorbing fins 19, thereby defining wind passages. Thus, the heat-radiating fins 17 and 20 and the heat-absorbing fins 16 and 19 extend substantially along an axle shaft 1, while the annular members 16a and 19a extend in the direction of rotation of the wheels.

The heat-absorbing fins 16 and the annular members 16a are inclined in the same direction, and the heat-absorbing fins 19 and the annular members 19a are inclined in the same direction, thereby forming wind passages which extend from the side of the bearing 5a through the spaces between the rotor frame 10 and the stator core 4 to the side of the other bearing 5b.

In the above-described second embodiment, if the direction of rotation of the rotor frame 10 and the brackets 15 and 18 is changed, air is circulated with the direction of its circulation changed (see FIG. 4).

As in the case of the first embodiment, air is circulated through the machine to cool the heat-generating portion of the motor, and the heat of the circulated air is positively radiated to the outside by the heat-absorbing fins 16 and 19 and the heat-radiating fins 17 and 20, thereby more enhancing the cooling effect.

Figure 8:
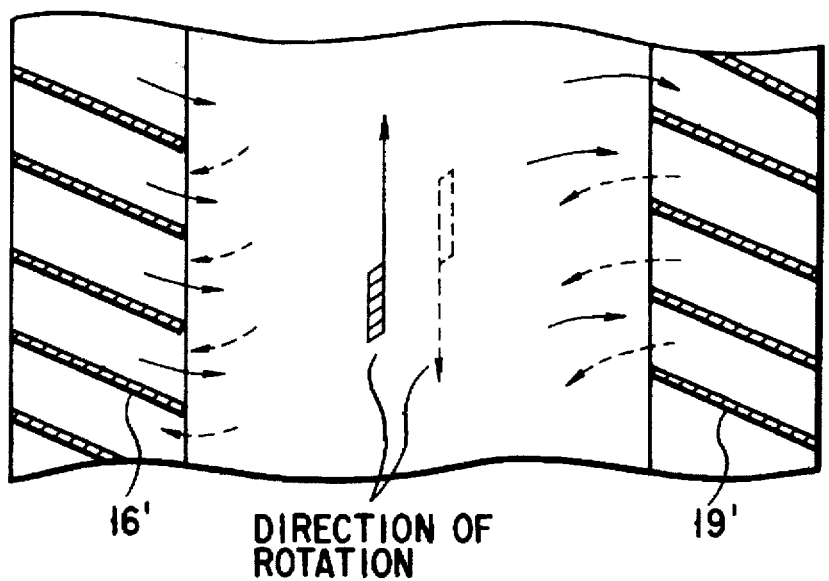
FIG. 8 is a development elevation, showing another example of the interior of the machine of FIG. 5.

Although in the second embodiment shown in FIGS. 5-7, the bent heat-absorbing fins 16 and 19 are employed, they may be replaced with straight heat-absorbing fins 16' and 19' as shown in FIG. 8.

Figure 9:
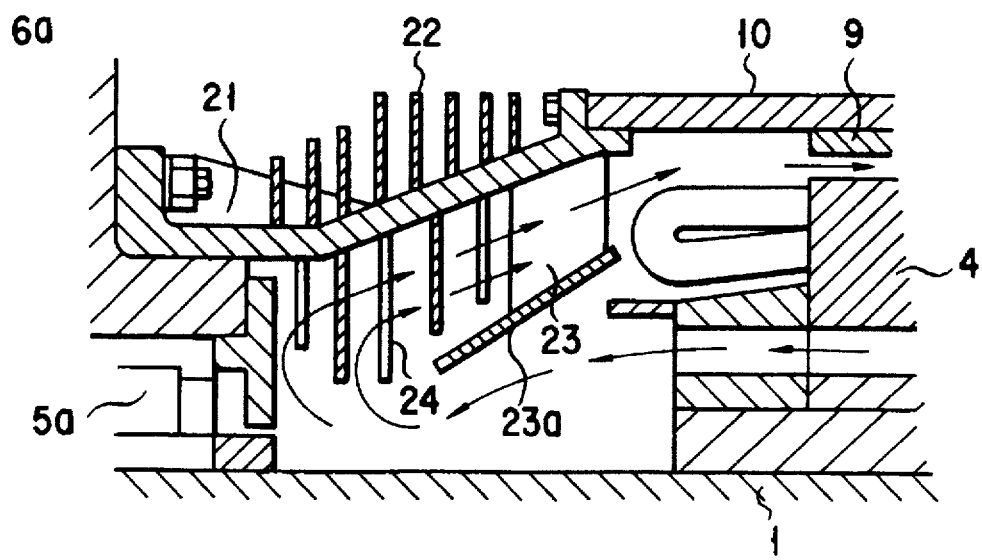
FIG. 9 is a sectional view, showing a bracket section on one side of an electric rotary machine according to a third embodiment of the invention.
Figure 10:
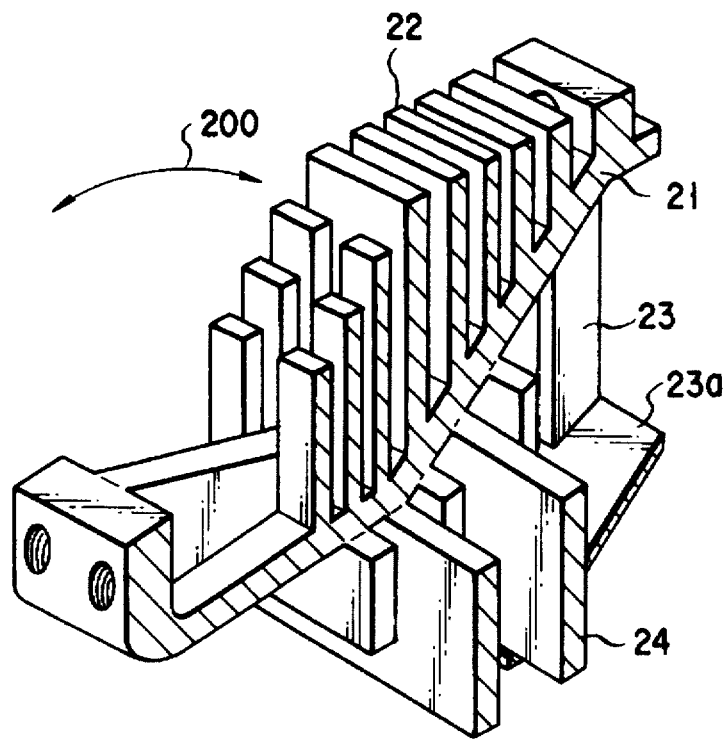
FIG. 10 is a partial perspective view, showing a heat-radiating fin, a bracket and a heat-absorbing fin employed in the electric rotary machine of FIG. 9.

As is shown in FIGS. 9 and 10, in an electric rotary machine and an electric motor vehicle according to a third embodiment of the invention, a multiple of annular heat-radiating fins 22 are mounted on the outer peripheral surface of one of brackets 21 axially parallel to each other at regular intervals. A cooling fan 23 is mounted on the inner peripheral surface of the one bracket 21. A multiple of arcuate heat-absorbing fins 24 are mounted on the inner peripheral surface of the one bracket 12 at circumferentially and axially regular intervals, such that they have their major surfaces arranged perpendicular to the axis of the bracket so as not to serve as fans, and such that the circumferential fins included in a plane perpendicular to the axis are circumferentially displaced from those included in another plane perpendicular to the axis. An annular member 23a is coupled with the radially inner ends of the heat-absorbing fins 13 and defines wind passages therebetween. The heat-radiating fins 22, the heat-absorbing fins 24 and the annular member 23a extend in a direction of rotation, while the heat-absorbing fins 24 extend along the axis of the bracket.

The heat-radiating fins 22 employed in the above-described electric rotary machine and the electric motor vehicle according to the third embodiment generates only low noise even when the motor is rotated at high speed. Moreover, by virtue of the cooling or circulating fan 23 mounted in addition to the heat-absorbing fins 24, the rate of circulation of air can be set appropriately. Also, the cooling effect can be enhanced by increasing the number of the heat-absorbing fins 24 irrespective of the circulation rate.

Figure 11:
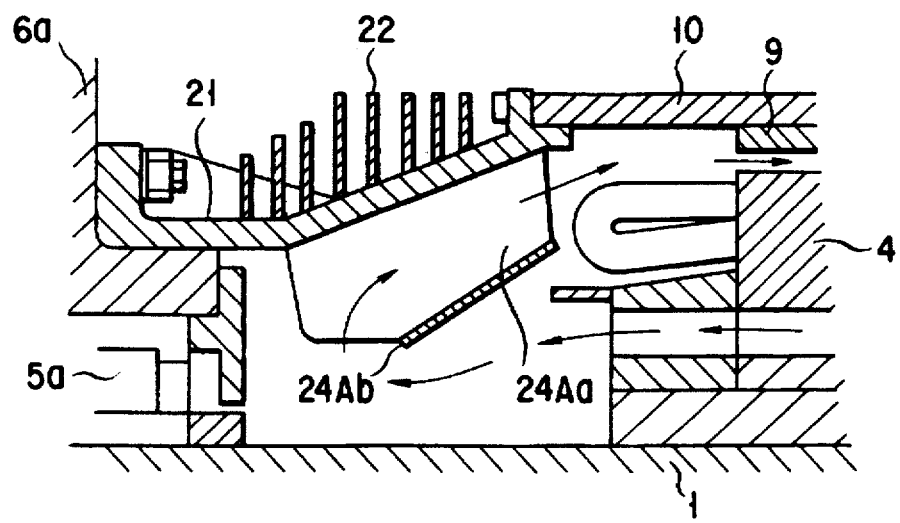
FIG. 11 is a sectional view, showing a bracket section on one side of an electric rotary machine according to a modification of the third embodiment of the invention.

As is shown in FIG. 11, the heat-absorbing fins 24 extending in the direction of rotation may be replaced with axially-extending heat-absorbing fins 24Aa and an annular member 24Ab extending in the direction of rotation and coupled with the fins 24Aa.

Figure 12:
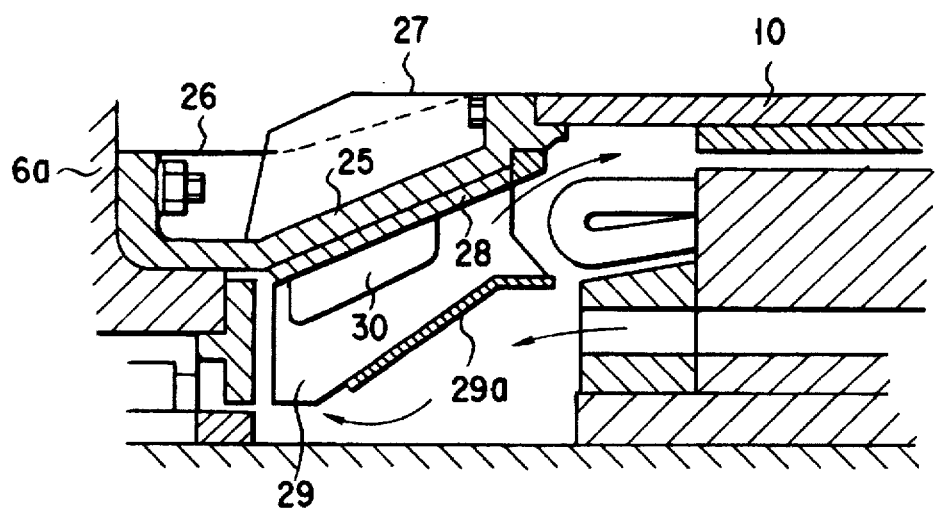
FIG. 12 is a sectional view, showing a bracket section on one side of an electric rotary machine according to a fourth embodiment of the invention.
Figure 13:
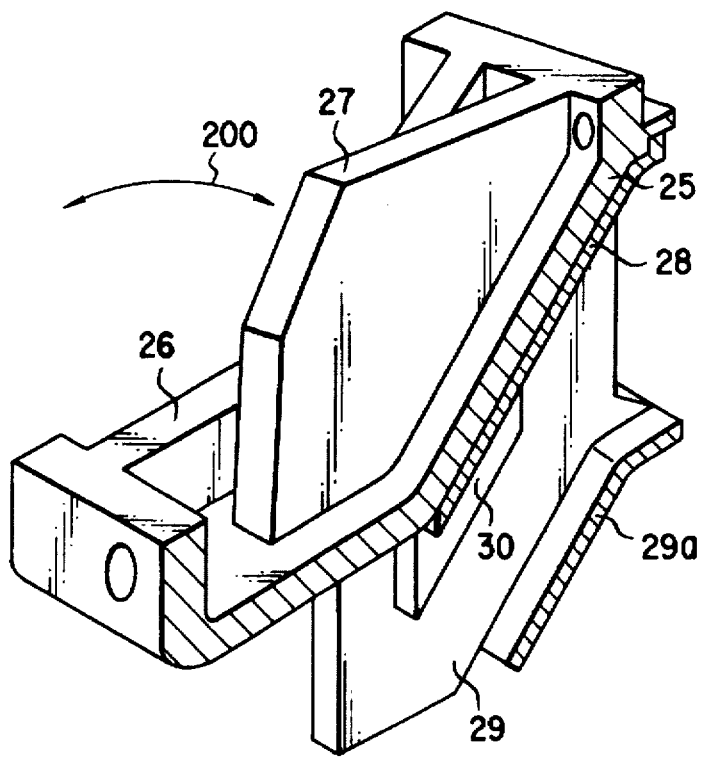
FIG. 13 is a partial perspective view, showing a heat-radiating fin, a bracket and a heat-absorbing fin employed in the electric rotary machine of FIG. 12.

Referring then to FIGS. 12 and 13, an electric rotary machine and an electric motor vehicle according to a fourth embodiment will be described. In this embodiment, a multiple of axially-elongated heat-radiating fins 27 and auxiliary ribs 26, which serve also as radiating fins, are circumferentially alternately mounted on the outer peripheral surface of one of brackets 25 at regular intervals. This structure enhances the radiation properties, increases the rigidity of the bracket 25, and reinforces the fastening mechanism between the bracket 25 and the wheel 6a. Moreover, an inner bracket 28 made of an aluminum alloy, etc. is attached to the inner peripheral surface of the bracket 25. A multiple of axially-elongated heat-absorbing fins 29, which also serve as circulation fans, are mounted on the inner peripheral surface of the inner bracket 28 at circumferentially regular intervals. Many heat-absorbing fins 30 are interposed between each adjacent pair of the heat-absorbing fins 29.

Furthermore, an annular member 29a is coupled with the radially inner ends of the heat-absorbing fins 29, thereby defining wind passages extending from the side of the bearing 5a to the space between the stator core 4 and the rotor frame 10. Thus, the heat-radiating fins 27 and the heat-absorbing fins 29 and 30 extend along the axle shaft 1, and the annular member 29a in the direction of rotation.

Since in the electric rotary machine and the electric motor vehicle according to the fourth embodiment, the heat-absorbing fins are made of an aluminum alloy, etc. of high thermal conductivity, a high heat absorption effect can be expected and the machine and vehicle can be made light. The heat absorption effect can be more enhanced by increasing the size of the heat-absorbing fins 30.

Although in some of the above-described embodiments, the heat-radiating fins, the heat-absorbing fins and the annular member are provided at one of the brackets, they may be provided at both the brackets.

Referring last to FIGS. 14 and 15, an electric rotary machine and an electric motor vehicle according to a fifth embodiment will be described. In this embodiment, for that one of brackets which is not shown, heat-radiating fins are provided on the outer peripheral surface thereof and heat-absorbing fins and an annular member are provided on the inner peripheral surface, as in the FIG. 2 case. On the other hand, for the other bracket 31, a multiple of axially-elongated heat-radiating fins 32 are mounted on the outer peripheral surface thereof at circumferentially regular intervals, while a multiple of arcuate heat-absorbing fins 33 are mounted at circumferentially and axially regular intervals such that circumferential fins included in a plane perpendicular to the axis are circumferentially displaced from those included in another plane perpendicular to the axis.

In the electric rotary machine and the electric motor vehicle according to the fifth embodiment, air discharged from the machine by the heat-radiating fins, which also serve as circulating fins and are located on the side of one bracket (not shown), reaches the other side bracket 31 shown in FIG. 14. Then, the air passes spaces axially defined between the heat-absorbing fins 33. Thereafter, the air reaches a space close to the axle shaft 1, passes a wind hole axially formed through the stator core 4, and returns to the one side bracket (not shown). Since the heat-absorbing fins 33 are arranged at circumferentially regular intervals, they do not serve as fans while the brackets rotate, and hence do not interrupt the circulation of air.

Thus, air is circulated through the machine and efficiently cooled by the heat-absorbing fins and the heat-radiating fins.

As described above, the invention can provide a compact and light outer-rotor type electric rotary machine capable of effectively cooling a heat-generating section (core, coil) even if the machine is of a completely closed type, and an electric vehicle using the machine.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An outer-rotor type electric rotary machine located at a stationary unit for rotating rotary members, comprising:
    a shaft fixed to the stationary unit;
    a motor stator fixed to a longitudinally middle portion of the shaft;
    a motor rotor located opposed to the motor stator with a certain gap interposed therebetween, the motor rotor being rotated about the motor stator by an electro magnetic force generated between the motor rotor and the motor stator;
    a cylindrical rotor frame to which the motor rotor is attached; and
    first and second brackets attached to both opposite ends of the cylindrical rotor frame, respectively, each of the first and second brackets having the other end thereof fixed to a corresponding one of the rotary members and including an outer peripheral surface and an inner peripheral surface, at least one of the first and second brackets having a plurality of heat-radiating fins mounted on the outer peripheral surface, and a plurality of heat-absorbing fins mounted on the inner peripheral surface.

2. The outer-rotor type electric rotary machine according to claim 1, wherein the heat-absorbing fins also serve as a fan mechanism for circulating air through the machine.

3. The outer-rotor type electric rotary machine according to claim 2, wherein the fan mechanism is an axial fan mechanism realized by arranging the brackets such the heat-absorbing fins have the same inclination relative to the shaft.

4. The outer-rotor type electric rotary machine according to claim 1, further comprising a fan provided on the inner peripheral surface of each of the brackets for circulating air through the machine.

5. The outer-rotor type electric rotary machine according to claim 1, further comprising an inner bracket fixed to the inner peripheral surface of each of the brackets and made of a thermally conductive material, and a plurality of heat-absorbing fins mounted on the inner peripheral surface of the inner bracket.

6. The outer-rotor type electric rotary machine according to claim 1, wherein the heat-radiating fins each include a member extending along the shaft.

7. The outer-rotor type electric rotary machine according to claim 1, wherein the heat-radiating fins each include a member extending in a direction of rotation of the motor rotor.

8. The outer-rotor type electric rotary machine according to claim 1, wherein the heat-absorbing fins each include a member extending along the shaft.

9. The outer-rotor type electric rotary machine according to claim 1, wherein the heat-absorbing fins each include a member extending in a direction of rotation of the motor rotor.

10. The outer-rotor type electric rotary machine according to claim 5, wherein the heat-absorbing fins each include a member extending along the shaft.

11. An electric motor vehicle having an outer-rotor type electric rotary machine, comprising:
    a vehicle truck;
    an axle shaft fixed to the vehicle truck;
    a motor stator fixed to a longitudinally middle portion of the shaft;
    a motor rotor located opposed to the motor stator with a certain gap interposed therebetween, the motor rotor being rotated about the motor stator by an electric magnetic force generated between the motor rotor and the motor stator;
    a cylindrical rotor frame to which the motor rotor is attached;
    first and second brackets attached to both opposite ends of the cylindrical rotor frame, respectively, each of the first and second brackets including an outer peripheral surface and an inner peripheral surface, at least one of the first and second brackets having a plurality of heat-radiating fins mounted on the outer peripheral surface, and a plurality of heat-absorbing fins mounted on the inner peripheral surface;
    first and second bearings provided at both opposite ends of the axle shaft; and
    first and second wheels fixed to the axle shaft via the first and second bearings, respectively, and also to the other ends of the brackets, respectively.

12. The outer-rotor type electric rotary machine according to claim 11, wherein the heat-absorbing fins also serve as a fan mechanism for circulating air through the machine.

13. The outer-rotor type electric rotary machine according to claim 12, wherein the fan mechanism is an axial fan mechanism realized by arranging the brackets such the heat-absorbing fins have the same inclination relative to the shaft.

14. The outer-rotor type electric rotary machine according to claim 11, further comprising a fan provided on the inner peripheral surface of each of the brackets for circulating air through the machine.

15. The outer-rotor type electric rotary machine according to claim 11, further comprising an inner bracket fixed to the inner peripheral surface of each of the brackets and made of a thermally conductive material, and a plurality of heat-absorbing fins mounted on the inner peripheral surface of the inner bracket.

16. The outer-rotor type electric rotary machine according to claim 11, wherein the heat-radiating fins each include a member extending along the axle shaft.

17. The outer-rotor type electric rotary machine according to claim 11, wherein the heat-radiating fins each include a member extending in a direction of rotation of the motor rotor.

18. The outer-rotor type electric rotary machine according to claim 11, wherein the heat-absorbing fins each include a member extending along the axle shaft.

19. The outer-rotor type electric rotary machine according to claim 11, wherein the heat-absorbing fins each include a member extending in a direction of rotation of the motor rotor.

20. The outer-rotor type electric rotary machine according to claim 15, wherein the heat-absorbing fins each include a member extending along the axle shaft.

* * * * *